United States Patent [19]
Neves

[11] 3,888,551
[45] June 10, 1975

[54] APPARATUS FOR CONTROLLING THE ACTUATION OF THE BRAKES OF A MOTOR VEHICLE

[76] Inventor: Antonio Maria Castello Brancoe Neves, Dominguisa, Tortasendo, Covilha, Portugal

[22] Filed: Oct. 29, 1973

[21] Appl. No.: 410,365

Related U.S. Application Data

[63] Continuation of Ser. No. 138,658, April 29, 1971, abandoned.

[30] Foreign Application Priority Data
Apr. 30, 1970 Portugal .............................. 53698

[52] U.S. Cl. ............ 303/84 A; 188/151 A; 303/6 R
[51] Int. Cl. ............................................ B60t 17/18
[58] Field of Search ............ 188/151 A, 345, 106 P; 303/6 C, 13, 6 R, 84

[56] References Cited
UNITED STATES PATENTS

| | | |
|---|---|---|
| 1,987,435 | 1/1935 | Engel .............................. 303/13 |
| 2,008,975 | 7/1935 | Boughton et al. ................. 188/345 |
| 2,195,214 | 3/1940 | Jacob ............................... 303/84 A |
| 2,918,148 | 12/1959 | Uhlenhaut et al. ................. 188/345 |
| 3,473,851 | 10/1969 | Neves ............................... 303/84 A |
| 3,512,846 | 5/1970 | Sheppard .......................... 188/345 |
| 3,680,314 | 8/1972 | Toomey .......................... 188/345 X |

*Primary Examiner*—Trygve M. Blix
*Assistant Examiner*—Douglas C. Butler
*Attorney, Agent, or Firm*—Waters, Schwartz & Nissen

[57] ABSTRACT

A multi-wheel vehicle has a braking system comprising two independent branch circuits connected in parallel to all the wheels of the vehicle and separately supplied with pressure fluid to actuate the brakes of the wheels. Upon rupture in one circuit, this circuit is disconnected from the other circuit by the closure of check valves and is disconnected from the pressure fluid supply while the other circuit is operative to supply all the wheels with pressure fluid.

1 Claim, 6 Drawing Figures

3,888,551

PATENTED JUN 10 1975     SHEET    1

PATENTED JUN 10 1975　　　SHEET 2　　　3,888,551
FIG. 3
*PRIOR ART*
FIG. 4
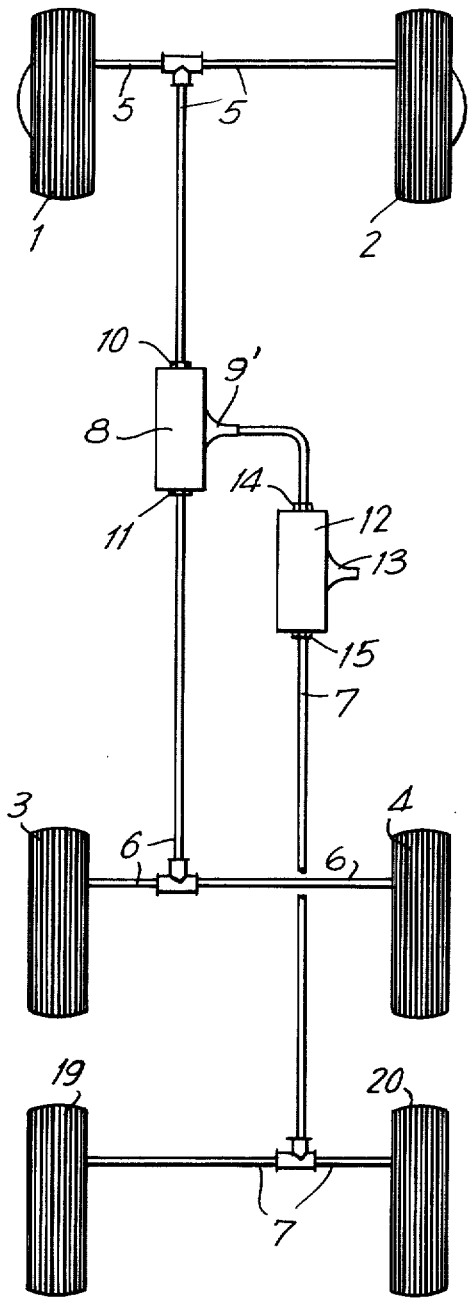
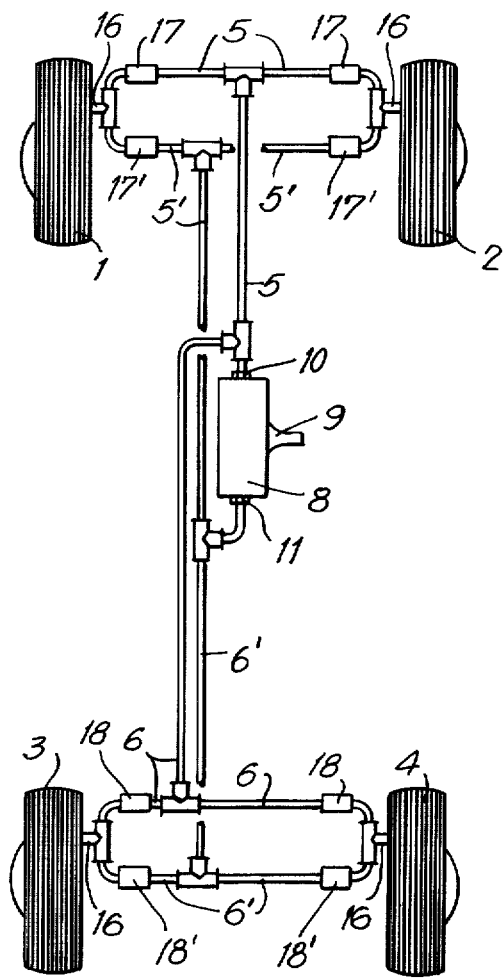

APPARATUS FOR CONTROLLING THE ACTUATION OF THE BRAKES OF A MOTOR VEHICLE

CROSS-RELATED APPLICATION

This application is a continuation of copending application Ser. No. 138,658 filed Apr. 29, 1971 and now abandoned and claims the priority of the application filed in Portugal Apr. 30, 1970.

BRIEF SUMMARY OF THE INVENTION

The present invention relates to dual circuits for hydraulic or pneumatic brakes of motor vehicles. Such dual circuits provide protection in the case of a rupture in the lines of one circuit.

Until recently most automobiles, trucks and other motor vehicles, equipped with pneumatic or hydraulic brakes, were provided with a single actuation circuit for the four or more brakes of the wheels. This single circuit, in the case of pneumatic brakes, was constituted by a main reservoir and a master valve, and in the case of hydraulic brakes by a master pump and a single main cylinder. In both cases, the feed of the circuit is actuated by the brake pedal. Also, in both systems the pressure fluid enters the circuit through a single line and is introduced by means of various branches into the different lines which feed all the brake cylinders actuating the brake drums of the wheels.

It is evident that a rupture in one of these lines renders the entire actuation system pressureless, for the obvious reason that they are all in communication with one another, so that, in this case, all the brakes of the vehicle are incapable of operating, which may have disastrous consequences. If at least part of the wheels of the vehicle had a brake circuit available, for example, if the actuation circuit could be subdivided into two or more separate branches, preferably one branch for each axle of the vehicle, a defect in one of the branches would not jeopardize the operation of the brakes of the wheels corresponding to the other parts of the circuit. It is only recently that some automobiles, trucks, etc. have been manufactured with a brake circuit formed by two separate branches. In these cars the circuit consists of two separate branches for the hydraulic brakes and contains a master cylinder with two pistons, each operating in its own cylinder and both actuated simultaneously by the brake pedal. The outlet of each of these separate cylinders feeds one half of the feed circuit of the brakes, i.e. one half feeds the brakes of the wheels on the front axle, and the other the brakes of the wheels on the rear axle. However, many cars in use, and some still being produced have a single circuit for brakes, and hence are subject to the danger previously described.

Constructions are known which permit changing a single circuit into a dual circuit. U.S. Pat. No. 3,473,851 of the present Applicant discloses a double safety valve which can be installed between the half of the pneumatic or hydraulic circuit which feeds the brake drums of the front wheels and the half of the circuit which feeds the brakes of the rear wheels of the vehicle. The circuit actuating the brakes of the vehicle is thus divided into two separate halves, which can function independently of each other. While, for example, the hydraulic master pump of the vehicle, originally installed and provided with a single main cylinder, remains unchanged, the vehicle equipped with said valve now actually has two separate circuits for the front and rear brakes and enjoys the same safety as cars made with a dual master pump and separate circuits.

The operation of the separate circuits obtained with the use of a double safety valve (U.S. Pat. No. 3,473,851) is identical with that of the known separate circuits. In case of rupture of one of the halves or branches of the circuit, the brakes of the two corresponding wheels in this half will be out of service, while the other half of the circuit remains intact, insuring, therefore, the functioning of the brakes of the wheels of that half. Said valve effects at the same time sealing of the damaged branch of the circuit, so as to eliminate or avoid losses of pressure fluid and to assure for the part of the circuit which remains intact, a sufficient feed of pressure fluid to maintain the corresponding brakes in operation until the necessary repairs are made.

For motor vehicles with more than four wheels, for example, trucks of six wheels with two rear axles, the utilization of two valves of the above-mentioned type can advantageously divide an existing circuit into three independent branches, namely one branch for each axle, with the same safety effect as previously described, viz. in case of rupture in one of the branches, the brakes corresponding to the axles of the other two branches remain intact.

However, in both the case of separate circuits, originally installed, and the original single circuit which was subdivided into two or more separate branches by means of one or more valves according to said patent, a disadvantage is that the vehicle, in case of a rupture in one of the branches of the brake circuit, must continue to operate with only part of the brakes until the necessary repair is made, and hence is without its full normal brake capacity. This means a reduction of normal safety.

An object of the present invention is to provide brake apparatus which eliminates the above-mentioned disadvantage in a vehicle equipped with pneumatic or hydraulic brakes wherein only part of its brake capacity remains after a branch of the actuation circuit of the brakes has been ruptured.

The brake apparatus according to the present invention can be installed in motor vehicles with independent dual circuits for actuation of all brakes (pneumatic or hydraulic) whether originally provided with single circuits subdivided into two or more separate branches, by means of one or more valves according to said patent, or originally installed with separate circuits.

The brake apparatus according to the present invention is characterized in that the brake consists of two parallel branch systems, separate and independent, each feeding all the brakes, which in turn all have a T-shaped connector, each arm of the connector being connected to a respective one of said separate branch systems.

Each branch of this new dual circuit is fed separately, either by the dual feed system existing in the vehicle, or by one of the outlets of the distribution valve of said patent.

To maintain the necessary pressure in one of the branches of the circuit, in case of a leakage or rupture in the other branch, each branch at each brake is provided with a check valve, which closes in case of a sudden pressure drop in the separate branch in question.

This check valve permits the functioning of the actuation circuit for all brakes, stopping the outflow of fluid in the direction of the leak. Likewise, if the two branches are fed by the distribution valve according to the mentioned patent, the outlet of this valve will also be sealed in the direction of the leak. The check valves remain closed while the intact actuation branch is under the pressure of a braking operation, but open again when this pressure, after completed braking, falls to the normal value, the opening of these valves causing losses of brake fluid at the place where the leak or rupture occurred.

Thus, after repeated braking before the repair has been made, a considerable amount of brake fluid may be lost.

This disadvantage can be efficiently eliminated by the use of mechanically blocking check valves. These valves, once closed, remain closed by mechanical means to seal the actuation branch which showed the sudden pressure drop, until normal service is restored by a special manipulation, including possibly the bleeding of the branch of the actuation circuit, after repair of the rupture therein. By the utilization of these blocking check valves, the dual circuit according to the present invention attains maximum safety, permitting an unlimited number of normal braking operations on all wheels of the vehicle and avoiding any subsequent loss of the brake fluid of the brake system, until the subsequent repair.

The present invention will next be described in greater detail with reference to several embodiments thereof, diagrammatically illustrated in the annexed drawings.

BRIEF DESCRIPTION OF THE DRAWING

FIG. 3 is a variant of FIG. 2, offering greater but still partial safety after a break in one of the lines;

FIG. 4 is a view similar to FIG. 1 showing the independent dual circuits according to the present invention, applied to a vehicle of four wheels and with total safety after a break in one of the lines;

DETAILED DESCRIPTION

Figure 1:
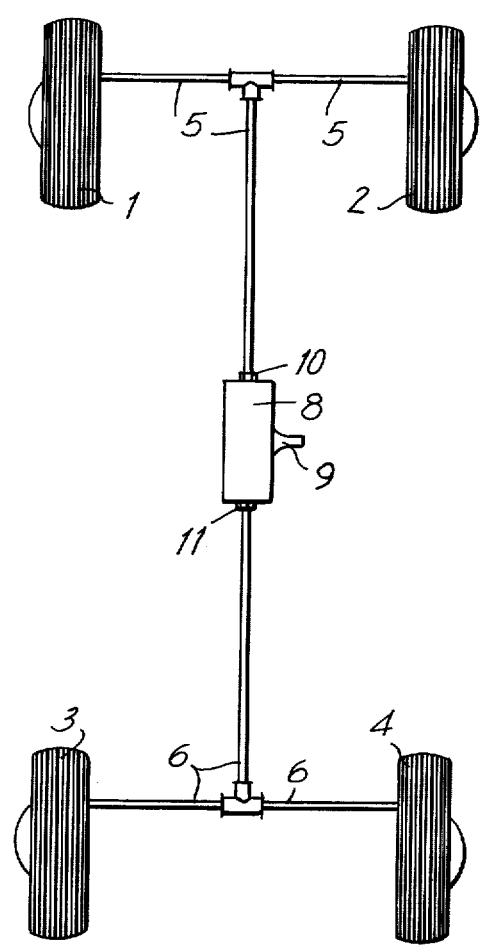
FIG. 1 is a schematic plan view of the four wheels of a motor vehicle equipped with an actuation circuit subdivided into two separate branches, according to the prior art, offering partial safety after a break in one of the branches.

A conventional brake circuit with two separate branches is shown in FIG. 1. In this Figure, as in FIGS. 2 to 5, the left front wheel is designated by numeral 1, and the right front wheel by numeral 2. The left and right rear wheels are designated by numerals 3 and 4 respectively. Brake fluid for the front wheels 1 and 2 is fed thereto through branch pipe 5 and the brakes at the rear wheels 3 and 4 are actuated through branch pipe 6. The separate feeding of branches 5 and 6, in accordance with conventional constructions is effected by a dual feed system existing in the vehicle (in the case of vehicles of recent construction) or, as is illustrated in FIG. 1, by means of a distribution valve 8, whose inlet 9 is connected to a master cylinder (not shown) i.e. the conventional source of pressure for the brake fluid in general, while the outlet 10 of valve 8 communicates with the branch 5 of the front wheels and the outlet 11 of the valve 8 communicates with the branch 6 of the rear wheels. Such distribution valve is shown in my U.S. Pat. No. 3,473,851.

In case of a leak or rupture in one of the branches, for example in branch 5 corresponding to the brakes of the front wheels 1 and 2, valve 8 will close outlet 10 at the time of the next braking operation, due to the absence of a counter-pressure in branch 5. Outlet 10 remains sealed until the necessary repair is made, on which occasion the normal service conditions of valve 8 will be restored; branch 6 for the brakes of the rear wheels 3 and 4 remain in operation. The brakes of the front wheels 1 and 2 are temporarily out of service.

Figure 2:
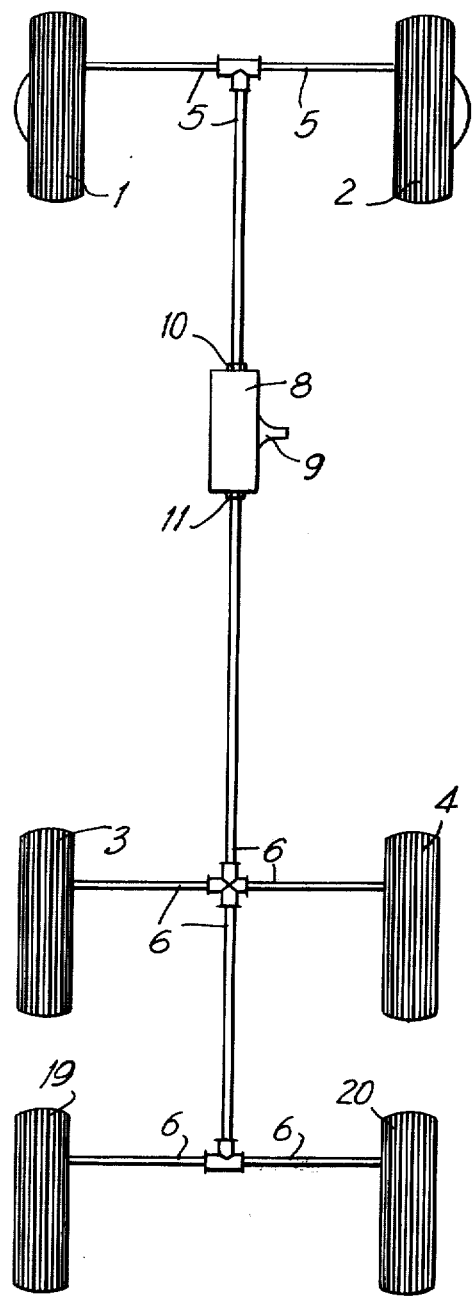
FIG. 2 is a similar view showing a vehicle with six wheels, likewise offering partial safety after a break in one of the branches.

FIG. 2 shows the application, in a vehicle of six wheels, similar to FIG. 1 but with a third axle with left and right wheels 19 and 20 respectively. The branch 6 has branch systems for each rear axle, arranged in parallel. In this case, if one of the branch pipes of branch 6 suffers a rupture, the entire branch 6 is pressureless and the brakes of the four rear wheels are out of service. Due to closure of the outlet valve 11 of the distribution valve 8, branch 5 of the brake circuit continues to be under pressure and the brakes of the front wheels 1 and 2 are operative.

FIG. 3 shows a variant of the arrangement in FIG. 2, with an improvement which insures, in the case of a rupture in the branch of one of the three axles, continued operation of the brakes in the two other branches of the circuit of the vehicle. In this variant, two distribution valves 8 and 12 are employed. In this arrangement, the distribution valve 12 receives the brake fluid under pressure at an inlet 13 in the same manner as the inlet 9 of valve 8 in FIGS. 1 and 2. The outlet 14 of valve 12, is connected to the inlet 9' of the distribution valve 8 which in turn is connected, as in FIGS. 1 and 2, by its outlet 10 to branch 5 for the brakes of the front wheels 1 and 2, and by its outlet 11 to branch 6 for the brakes of the rear wheels 3 and 4 of the second axle of the vehicle. This second axle, therefore, continues to be actuated by a branch system separate from that of the third axle, which is served by the branch 7 which communicates with the outlet 15 of the distribution valve 12. In the case of a rupture, for example, in branch 6 of the second axle, the outlet 11 of the distribution valve 8 closes, while branches 7 and 5 continue in operation. The truck, therefore, loses only the brake capacity of one of the three axles and remains with two-thirds of its total brake capacity.

FIG. 4 shows a dual and independent circuit, according to the present invention, applied to a four-wheel motor vehicle. As seen, the circuit comprises two independent branch systems, each with a branch for the wheels of the front axle and with a branch for the actuation of the rear wheels, both independent branch systems being fed by means of distribution valve 8. The distribution valve 8 has at the outlet 10 a T-shaped connector, one arm of which is connected to branch 5 for the brakes of the front wheels, while the other arm is connected to branch 6 for the brakes of the rear wheels 3 and 4. At the outlet 11 of the distribution valve 8 there is also a T-shaped connector which feeds the other branch system, consisting of the branches 5' for the front wheels 1 and 2 and the branch 6' for the rear wheels 3 and 4.

Figure 5:
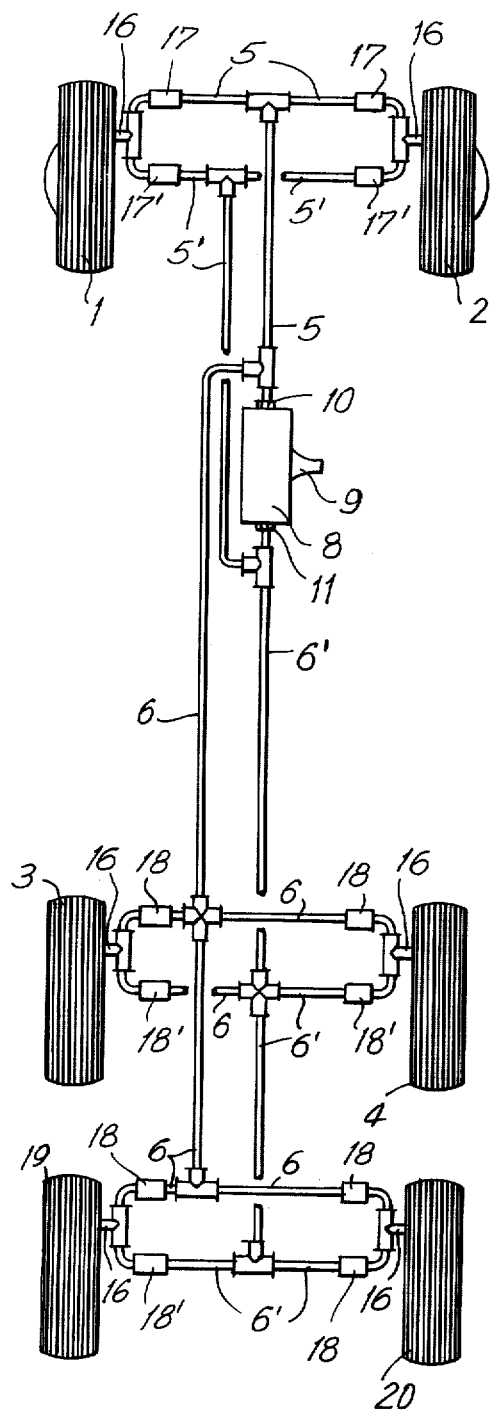
FIG. 5 is a view similar to FIG. 2, with the independent dual circuits according to the present invention, applied to a vehicle of six wheels, offering total safety after a break in one of the lines.
Figure 6:
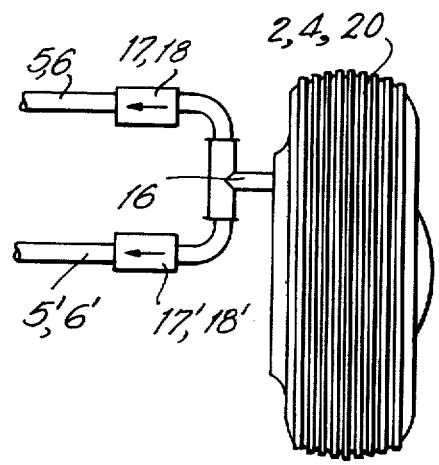
FIG. 6 is a detail view, on a larger scale, of the connection according to the invention of the two independent dual circuits to the brake of one of the wheels on the right side of the vehicle.

The connection of the branches 5 and 5' to the brakes of the front wheels 1 and 2, as well as the connection of the branches 6 and 6' to the brakes of the rear wheels 3 and 4, is likewise made by means of T-shaped connectors designated by 16, as can be seen best in the detail of FIG. 6 which represents any of the right wheels of FIGS. 4 and 5. Each arm of the T-shaped connectors 16 is connected to one of the branches 5 or 5', 6 or 6', across a check valve 17 or 17', 18 or 18' respectively, which check valve closes when the pressure in the branch in question falls below the pressure prevailing inside the connector 16 and therefore in the brake in question.

In case of a rupture in one of the dual branch systems of the circuit, for example, in branch 5 of the branch system 5, 6 fed by the outlet 10 of the distribution valve 8, the outlet 10 closes and remains closed, sealing both branch 5 and branch 6 and preventing entrance of the brake fluid into these branches from the distribution valve 8 upon application of braking pressure at the inlet 9 of this valve. In this case, the fluid under pressure passes only through the outlet 11 of the distribution valve 8 and feeds the branches 5' and 6' which, in turn, feed all four brakes of the vehicle through check valves 17' and 18'. Since the other arm of the T-shaped connectors 16 of all these brakes is under actuation pressure, the check valves 17 and 18, which have on their other side the zero pressure prevailing in the damaged branch system 5, 6, close, preventing the loss of pressure and of brake fluid and insure an uninterrupted operation of all brakes of the vehicle after rupture in one of the branches of the brake circuit.

When the braking stops, the pressure in the branch systems 5', 6' decreases and check valves 17 open again, leaving the damaged branch system 5, 6 again in communication, although without pressure, with the remaining part 5', 6' of the circuit, by means of the valve 8 thus giving rise to losses even though small, of the brake fluid. If a number of repeated braking operations are effected before the necessary repair of the rupture, these small accumulated losses may result in a lack of brake fluid in the circuit. This is detectable by the motorist and, although it does not offer an immediate danger, is not desirable.

By constructing the check valves 17, 17', 18, 18' of a type which, once closed remain in that position, the above-mentioned disadvantage, namely the gradual loss of brake fluid, is eliminated. Such mechanically blocking check valves are disclosed in Portuguese patent application No. 53,634, and completely satisfy this requirement and insure, not only a continuation of the perfect operation of all brakes of the motor vehicle, after rupture has taken place in one of the branches of the dual branch systems of the brake circuit, but also avoid the loss of brake fluid of the system, so that the vehicle is assured of complete safety until the necessary repair of the rupture.

For the reason given in U.S. Pat. No. 3,474,851, the functioning of the distribution valve 8 must be restored after the repair of the rupture and, in some cases, a bleeding operation will be advisable.

FIG. 5 shows the dual brake circuit, with independent branch systems according to the present invention, for a six-wheel vehicle and the operation is similar to that in FIG. 4 and requires no further elaboration.

It is evident that the embodiments which have been described and illustrated in the annexed drawings are given only by way of illustration and are not limitative. Many variants in the branch systems will become obvious to those skilled in the art without departing from the scope and spirit of the present invention as defined in the appended claims.

What is claimed is:

1. Brake apparatus for hydraulic or pneumatic brakes of a motor vehicle having at least two wheels, said apparatus comprising two independent branch circuits each connected to all the wheels of the vehicle for operating the brakes thereof, and means connecting said circuits to said wheels in parallel with one another, said means comprising a T-shaped connector at each wheel having one arm connected to the brake actuator of such wheel and second and third arms connected to respective of said circuits, means including a single master cylinder feeding both said circuits separately with pressure fluid comprising a distribution valve having an inlet for pressure fluid and two outlets, each outlet being connected to a respective circuit, and a check valve in each circuit adjacent each T-shaped connector such that each of the second and third arms of each T-shaped connector is fed from the master cylinder via a respective one of said check valves, each check valve being constructed to close upon sudden pressure drop in the associated circuit to prevent flow of pressure fluid to such circuit from the other circuit and to remain closed after such closure thereof.

* * * * *